May 24, 1966 R. L. HUSTEAD 3,252,717
ADJUSTABLE TRAILER CHASSIS
Filed April 20, 1964
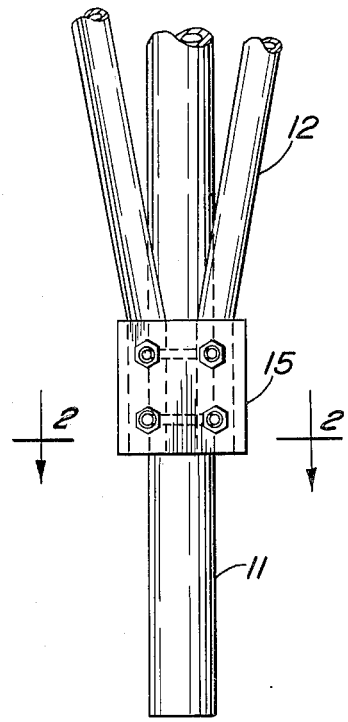
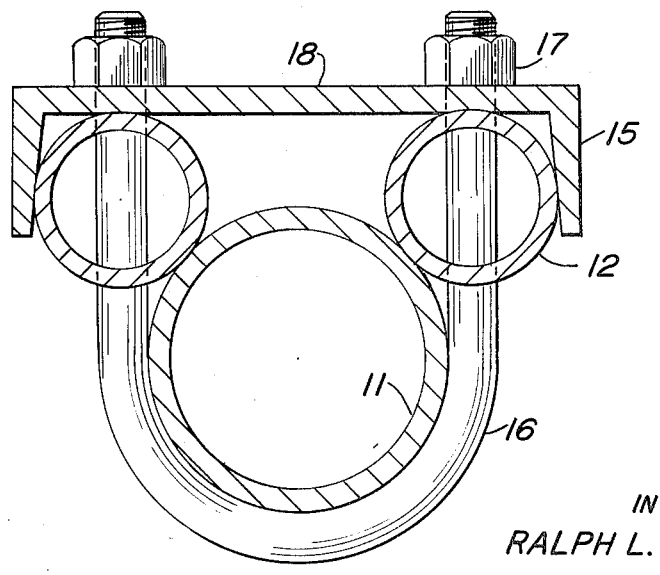
INVENTOR
RALPH L. HUSTEAD

3,252,717
ADJUSTABLE TRAILER CHASSIS
Ralph L. Hustead, 1515 N. Ogden, Chicago, Ill.
Filed Apr. 20, 1964, Ser. No. 360,818
1 Claim. (Cl. 280—482)

*Object*

The object of the invention is to provide a trailer chassis that can be used for many needs and yet keep the cost down. The friction clamp is to give a quick release of tongue for length adjustment for hauling any length load.

*Brief description*

FIG. 1 is a top view of tongue and side frame assembly, the assembly uniting by a friction clamp.

FIG. 2 is an end view of the tongue and side frames bound by the friction clamp.

*Detailed description*

FIG. 1 is a top view of friction clamp binding tongue and side frame members in place. 15 is the top channel plate of clamp, 11 is the tongue and 12 the side frame members.

FIG. 2 is an end view of friction clamp. 18 is the friction clamp assembly. U-bolt encircles tongue 11 passing through holes in side frame members 12 continuing through top channel 15. The two nuts 17 pull the entire assembly together, the pressure forces the assembly by friction into a solid unit, yet by release of the two nuts the tongue is immediately released for length adjustment.

I claim:

A trailer chassis having side frame members converging forwardly to tangential contact with a longitudinally extending tongue member, a friction clamp having one side adjacent said side frame and tongue members, U-bolts disposed about said tongue member, said U-bolts having a bight configuration conforming generally to the contour of one side of said tongue member, the legs of said U-bolts passing through said frame members and said friction clamp, securing means on the other side of said friction clamp for releasably securing said side frame members, said tongue member, said clamping member and said U-bolt together as a structurally rigid unit.

References Cited by the Examiner

UNITED STATES PATENTS

| | | | |
|---|---|---|---|
| 988,393 | 4/1911 | Spaulding | 280—142 |
| 1,085,038 | 1/1914 | Hall | 280—142 |
| 1,598,084 | 8/1926 | Kingham | 280—482 |
| 2,278,303 | 3/1942 | Blaser | 280—124 |
| 2,420,462 | 5/1947 | Carr | 280—124 |
| 2,450,977 | 10/1948 | McNamara | 280—142 |
| 3,119,629 | 1/1964 | De Puydt | 280—124 |
| 3,155,399 | 11/1964 | Fetzko | 280—482 |

FOREIGN PATENTS 1,091,928  11/1954  France.

BENJAMIN HERSH, *Primary Examiner.*

LEO FRIAGLIA, *Examiner.*

W. A. MARCONTELL, *Assistant Examiner.*